United States Patent
Suzuki et al.

(10) Patent No.: US 12,339,118 B2
(45) Date of Patent: Jun. 24, 2025

(54) ROTATION ANGLE DETECTION DEVICE AND ELECTRIC CONTROL DEVICE

(71) Applicant: TDK Corporation, Tokyo (JP)

(72) Inventors: Keiji Suzuki, Tokyo (JP); Tatsuya Kato, Tokyo (JP)

(73) Assignee: TDK Corporation, Tokyo (JP)

( * ) Notice: Subject to any disclaimer, the term of this patent is extended or adjusted under 35 U.S.C. 154(b) by 250 days.

(21) Appl. No.: 18/188,933

(22) Filed: Mar. 23, 2023

(65) Prior Publication Data

US 2023/0358526 A1  Nov. 9, 2023

(30) Foreign Application Priority Data

May 9, 2022  (JP) .................... 2022-076945

(51) Int. Cl.
*G01B 7/30*  (2006.01)
*B60L 3/12*  (2006.01)
(Continued)

(52) U.S. Cl.
CPC .............. *G01B 7/30* (2013.01); *B60L 3/12* (2013.01); *B60T 17/22* (2013.01); *H02K 11/215* (2016.01);
(Continued)

(58) Field of Classification Search
CPC .......... G01D 5/145; G01D 5/147; G01D 5/12; G01D 5/14; G01D 5/16; G01D 5/165; G01D 5/2457; G01D 5/2013; G01D 5/2046; G01D 5/24476; G01D 5/245; G01B 7/30; G01R 33/025; G01R 33/07; G01R 33/0206; G01R 33/06; G01R 33/063; G01R 33/09;
(Continued)

(56) References Cited

U.S. PATENT DOCUMENTS 5,164,668 A  11/1992  Alfors
6,414,482 B1 * 7/2002  Mase .................... F02D 11/106
324/207.2
(Continued)

FOREIGN PATENT DOCUMENTS

JP  2007-93418 A  4/2007
JP  2007-93420 A  4/2007
(Continued)

*Primary Examiner* — Thang X Le
(74) *Attorney, Agent, or Firm* — Posz Law Group, PLC

(57) ABSTRACT

A rotation angle detection device has a magnetic field generation unit rotatably provided integrally with a rotating body that rotates about a rotation axis, a magnetic field detection unit that detects a magnetic field generated by the magnetic field generation unit, and a magnetic field transmission unit that covers a portion of the magnetic field generation unit. The magnetic field generation unit has a first surface, a second surface positioned opposite to the first surface, and a side surface connecting the outer peripheries of the first and the second surfaces. The magnetic field transmission unit includes a first magnetic field transmission unit that covers a portion of the side surface. The magnetic field generated by the magnetic field generation unit includes first and second magnetic field components. The magnetic field detection unit detects the first magnetic field component and the second magnetic field component.

20 Claims, 12 Drawing Sheets

(51) Int. Cl.
   *B60T 17/22*   (2006.01)
   *H02K 11/215*  (2016.01)
   *B60T 13/74*   (2006.01)
   *F16D 66/00*   (2006.01)

(52) U.S. Cl.
   CPC ....... *B60T 13/745* (2013.01); *F16D 2066/003* (2013.01)

(58) Field of Classification Search
   CPC .. G01R 33/093; G01R 33/0052; G01R 33/18; G01N 27/9033; G01N 27/902; G01N 27/9013; G01N 27/904; G01N 27/223; G01N 27/82; G01N 27/9093
   See application file for complete search history.

(56) References Cited

U.S. PATENT DOCUMENTS

| | | | |
|---|---|---|---|
| 7,221,153 | B2 | 5/2007 | Matsumoto et al. |
| 9,207,100 | B2 | 12/2015 | Frachon et al. |
| 11,231,295 | B2 * | 1/2022 | Inuzuka ................ G01D 5/145 |
| 2007/0069719 | A1 * | 3/2007 | Hatanaka ............... G01D 5/145 |
| | | | 324/207.25 |
| 2009/0146649 | A1 * | 6/2009 | Sato ........................ G01D 5/14 |
| | | | 324/207.25 |
| 2010/0060268 | A1 * | 3/2010 | Tokunaga ................ G01B 7/30 |
| | | | 324/207.2 |
| 2010/0280696 | A1 | 11/2010 | Yoshida et al. |
| 2010/0321008 | A1 | 12/2010 | Mita et al. |
| 2015/0330849 | A1 * | 11/2015 | Matsui .................... G01L 3/101 |
| | | | 73/862.331 |
| 2018/0094951 | A1 * | 4/2018 | Tima .................... G01D 5/2013 |
| 2022/0307863 | A1 * | 9/2022 | Suzuki ................... G01D 3/028 |

FOREIGN PATENT DOCUMENTS

| | | |
|---|---|---|
| JP | 2007-269281 A | 10/2007 |
| JP | 2009-37513 A | 2/2009 |
| JP | 2009-159788 A | 7/2009 |
| JP | 2010-85389 A | 4/2010 |
| JP | 5120384 B2 | 11/2012 |
| JP | 2013-61346 A | 4/2013 |
| JP | 2013-205032 A | 10/2013 |

* cited by examiner

ROTATION ANGLE DETECTION DEVICE AND ELECTRIC CONTROL DEVICE

BACKGROUND

Cross-Reference to Related Applications

This application claims priority from Japanese Patent Application No. 2022-076945 filed on May 9, 2022, the entire contents of which are incorporated herein by reference.

The present disclosure relates to a rotation angle detection device and an electric control device provided therewith.

In recent years, magnetic angle sensors, for example, which generate angle detection values having a corresponding relationship with the angle of an object, have been widely used for various applications such as detecting the rotational position of steering wheels or power steering motors in automobiles. An angle sensor system that uses a magnetic angle sensor is generally provided with a magnetic field generation unit that generates a rotating magnetic field, the direction of which rotates in conjunction with the rotation or linear movement of the object.

A magnetic angle sensor may be equipped with a plurality of magnetic field detection units that generate a plurality of detection signals with mutually different phases, and the magnetic angle sensor generates angle detection values by calculations using the plurality of detection signals. Each of the plurality of magnetic field detection units includes at least one magnetic detection element. The magnetic detection element includes a spin-valve-type magnetoresistive effect element (GMR element, TMR element or the like) that has, for example, a magnetization fixed layer the magnetization direction of which is fixed, a free layer the magnetization direction of which changes in accordance with the direction of a rotating magnetic field, and a nonmagnetic layer placed between the magnetization fixed layer and the free layer.

In a magnetic angle sensor, when the direction of the rotating magnetic field changes with a predetermined period, the waveforms of a detection signal based on the change in the magnetic field in the radial direction of the magnetic field generation unit and a detection signal based on the change in the magnetic field in the circumferential direction of the magnetic field generation unit are ideally sine curves (including sine and cosine waveforms). In addition, each detection signal may contain one or more error components corresponding to one or more harmonics of the ideal components. The angle detection value calculated by the angle sensor when each detection signal is composed of only the ideal components is equivalent to the true angle of the object. However, if each detection signal contains an error component and the waveform thereof is distorted from the sine curve, an error will occur in the angle detection value. In order to prevent errors in angle detection values, it is desirable to reduce error components that may be included in each detection signal.

In a known rotation angle detection device, at least one of the two detection signals (or waveforms of detection signals) in the radial direction and the circumferential direction is multiplied (or divided) by a correction coefficient, and the ratio of the maximum values of the two corrected detection signals (or waveforms of detection signals) is made equivalent to a ratio K' of the maximum values of the magnetic flux densities in the radial direction and the circumferential direction at the position where the sensor device is placed, and then the arctangent is calculated. Refer to, for example, JP Patent No. 5120384.

In such a rotation angle detection device, the rotation angle detection accuracy is improved by changing the magnetic flux density ratio in the radial direction and the circumferential direction. However, the strength of the magnetic field (the composite magnetic field of the radial magnetic field component and the circumferential magnetic field component) impressed on the magnetic field detection unit varies greatly depending on the rotation angle of the magnetic field generation unit. That is, there is a large difference between the maximum value and the minimum value of the strength of the magnetic field impressed on the magnetic field detection unit accompanying rotation of the magnetic field generation unit. Therefore, even if the detection signal is multiplied (or divided) by a correction factor, the angular error may not be sufficiently reduced. In addition, even if the angular error contained in the signal output from the magnetic field detection unit is corrected using, for example, a multi-point correction function, a relatively large angular error may remain in the signal after correction.

Embodiments are directed to a rotation angle detection device including: a magnetic field generation unit rotatable integrally with a rotating body that rotates about a predetermined rotation axis; a magnetic field detection unit that detects a magnetic field generated by the magnetic field generation unit; and a magnetic field transmission unit that covers a portion of the magnetic field generation unit, wherein there is a predetermined gap between the magnetic field generation unit and the magnetic field transmission unit. The magnetic field generation unit has a first surface, the outer periphery of which has a substantially circular shape, a second surface positioned opposite the first surface, and a side surface connecting the outer periphery of the first surface and the outer periphery of the second surface. The magnetic field transmission unit includes at least a first magnetic field transmission unit that covers a portion of the side surface on one side of the magnetic field detection unit. The first magnetic field transmission unit has a first end and a second end, which are two ends along the circumferential direction of the magnetic field generation unit. The magnetic field detection unit is provided near the first end of the first magnetic field transmission unit. The magnetic field generated by the magnetic field generation unit includes a first magnetic field component along a first direction and a second magnetic field component along a second direction orthogonal to the first direction, and the magnetic field detection unit detects the first magnetic field component and the second magnetic field component.

Embodiments are directed to a rotation angle detection device that detects a rotation angle of a rotating body by detecting a magnetic field generated from a magnetic field generation unit rotatable integrally with the rotating body, which rotates about a predetermined rotation axis. The rotation angle detection device includes a first surface, the outer periphery of which has a substantially circular shape, a second surface, the outer periphery of which has a substantially circular shape and is positioned opposite to the first surface, and a side surface connecting the outer periphery of the first surface and the outer periphery of the second surface. The rotation angle detection device includes a magnetic field detection unit that detects a magnetic field generated from the magnetic field generation unit and a magnetic field transmission unit capable of covering a portion of the magnetic field generation unit to form a predetermined gap between the magnetic field detection unit and the magnetic field transmission unit. The magnetic field transmission unit includes at least a first magnetic field transmission unit capable of covering one portion of the side surface at one side of the magnetic field detection unit. The first magnetic field transmission unit has a first end and a second end, which are ends along the circumferential direction of the magnetic field generation unit. The magnetic field detection unit is provided near the first end of the first magnetic field transmission unit. The magnetic field generated from the magnetic field generation unit includes a first magnetic field component along a first direction and a second magnetic field component along a second direction orthogonal to the first direction. The magnetic field detection unit detects the first magnetic field component and the second magnetic field component.

Embodiments are further directed to an electric control device including the above-described rotation angle detection device.

Embodiments are further directed to a traction motor unit including at least the above-described rotation angle detection device and a motor, where the rotation angle detection device detects the rotation angle of the motor.

Embodiments are further directed to a brake booster including at least the above-described rotation angle detection device, a motor, and a master cylinder, where the rotation angle detection device detects the rotation angle of the motor.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the technology.

DETAILED DESCRIPTION

Figure 1:
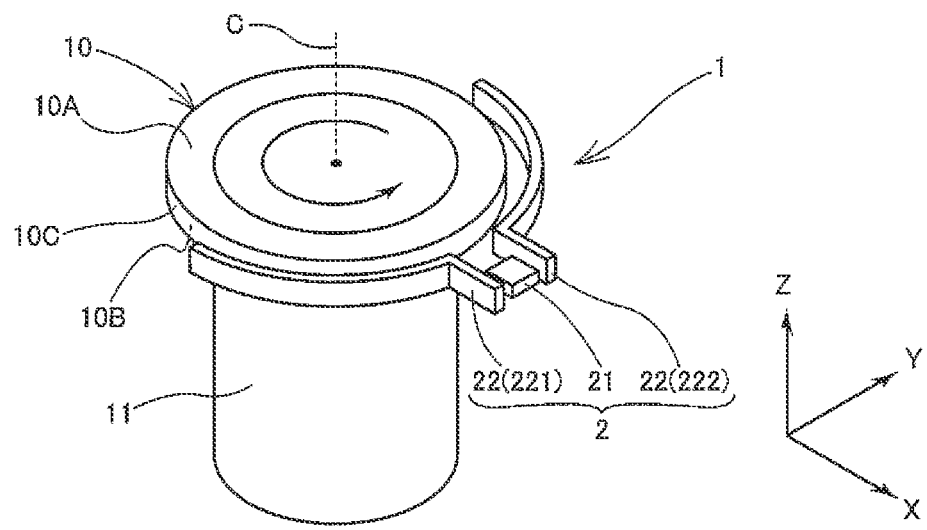
FIG. 1 is a perspective view showing a schematic configuration of a rotation angle detection device according to one example embodiment of the present disclosure.

The present disclosure is provided to further explain in an enabling fashion the best modes of performing one or more embodiments of the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

The following example embodiments provide a rotation angle detection device capable of improving angular accuracy and provide an electric control device, a traction motor unit, or a brake booster, for example, equipped with such a rotation angle detection device.

Aspect 1 of the present disclosure is a rotation angle detection device including a magnetic field generation unit rotatable integrally with a rotating body that rotates about a predetermined rotation axis; a magnetic field detection unit that detects a magnetic field generated by the magnetic field generation unit; and a magnetic field transmission unit that covers a portion of the magnetic field generation unit, wherein there is a predetermined gap between the magnetic field generation unit and the magnetic field transmission unit; the magnetic field generation unit has a first surface the outer periphery of which has a substantially circular shape, a second surface positioned opposite to the first surface, and a side surface connecting the outer periphery of the first surface and the outer periphery of the second surface. The magnetic field transmission unit includes at least a first magnetic field transmission unit that covers a portion of the side surface at a first side of the magnetic field detection unit. The first magnetic field transmission unit has a first end and a second end, which are two ends along the circumferential direction of the magnetic field generation uni. The magnetic field detection unit is provided near the first end of the first magnetic field transmission unit. The magnetic field generated by the magnetic field generation unit includes a first magnetic field component along a first direction and a second magnetic field component along a second direction orthogonal to the first direction; and the magnetic field detection unit detects the first magnetic field component and the second magnetic field component.

Aspect 2 of the present disclosure is the rotation angle detection device according to the above-described Aspect 1, wherein the magnetic field transmission unit includes a second magnetic field transmission unit that covers a portion of the side surface at a second side of the magnetic field detection unit, the second magnetic field transmission unit has a first end and a second end, which are two ends along the circumferential direction of the magnetic field generation unit. The magnetic field transmission unit is provided such that the magnetic field detection unit is located between the first end of the first magnetic field transmission unit and the first end of the second magnetic field transmission unit.

Aspect 3 of the present disclosure is the rotation angle detection device according to the above-described Aspect 2, wherein an angle formed by a first line segment connecting the rotation axis and the second end of the first magnetic field transmission unit and a second line segment connecting the rotation axis and the second end of the second magnetic field transmission unit is not greater than 180°.

Aspect 4 of the present disclosure is the rotation angle detection device according to the above-described Aspect 3, wherein the angle is at least 60° and not greater than 180°.

Aspect 5 of the present disclosure is the rotation angle detection device according to the above-described Aspect 3 or Aspect 4, wherein a line segment connecting the rotation axis and the magnetic field detection unit defines a third line segment when viewed along the rotation axis. When the angle is divided into a first angle formed by the first line segment and the third line segment, and a second angle formed by the second line segment and the third line segment, the first angle and the second angle are equivalent.

Aspect 6 of the present disclosure is the rotation angle detection device according to any one of the above-described Aspects 3 through 5, wherein a line segment connecting the rotation axis and the magnetic field detection unit defines a third line segment when viewed along the rotation axis. When the angle is divided into a first angle formed by the first line segment and the third line segment, and a second angle formed by the second line segment and the third line segment, the first angle and the second angle are different.

Aspect 7 of the present disclosure is the rotation angle detection device according to any one of the above-described Aspects 2 through 6, wherein the first magnetic field transmission unit has a first portion that includes the first end of the first magnetic field transmission unit, and a second portion that includes the second end of the first magnetic field transmission unit. The second magnetic field transmission unit has a first portion that includes the first end of the second magnetic field transmission unit, and a second portion that includes the second end of the second magnetic field transmission unit. The first portion of the first magnetic field transmission unit is a portion bent in a direction away from the side surface of the magnetic field generation unit. The second portion of the first magnetic field transmission unit is a portion facing the side surface of the magnetic field generation unit. The first portion of the second magnetic field transmission unit is a portion bent in a direction away from the side surface of the magnetic field generation unit. The second portion of the second magnetic field transmission unit is a portion facing the side surface of the magnetic field generation unit. The magnetic field detection unit is located between the first portion of the first magnetic field transmission unit and the first portion of the second magnetic field transmission unit.

Aspect 8 of the present disclosure is the rotation angle detection device according to the above-described Aspect 7, wherein the second portion of the first magnetic field transmission unit and the second portion of the second magnetic field transmission unit have equal gaps from the side surface of the magnetic field generation unit in the circumferential direction of the magnetic field generation unit.

Aspect 9 of the present disclosure is the rotation angle detection device according to the above-described Aspect 7 or Aspect 8, wherein the second portion of the first magnetic field transmission unit and the second portion of the second magnetic field transmission unit have unequal gaps from the side surface of the magnetic field generation unit in the circumferential direction of the magnetic field generation unit.

Aspect 10 of the present disclosure is the rotation angle detection device according to any one of the above-described Aspects 1 through 9, wherein the magnetic field detection unit includes a first magnetic field detection unit and a second magnetic field detection unit; and the first magnetic field detection unit and the second magnetic field detection unit are arranged at linearly symmetrical positions with a center of the magnetic field transmission unit in a direction of width as the axis of symmetry.

Aspect 11 of the present disclosure is the rotation angle detection device according to the above-described Aspect 10, wherein the first magnetic field detection unit and the second magnetic field detection unit are arranged at positions separated by equal distances from the side surface of the magnetic field generation unit.

Aspect 12 of the present disclosure is the rotation angle detection device according to any one of the above-described Aspects 1 through 11, wherein the magnetic field generation unit is magnetized in a first direction.

Aspect 13 of the present disclosure is the rotation angle detection device according to any one of the above-described Aspects 1 through 12, comprising a first molded unit that holds at least the magnetic field detection unit.

Aspect 14 of the present disclosure is the rotation angle detection device according to anyone of the above-described Aspects 1 through 13, including a second molded unit that holds the magnetic field transmission unit.

Aspect 15 of the present disclosure is the rotation angle detection device according to any one of the above-described Aspects 1 through 12, including a molded unit in which a first molded unit that holds at least the magnetic field detection unit and a second molded unit that holds the magnetic field transmission unit are integrally formed.

Aspect 16 of the present disclosure is a rotation angle detection device that detects a rotation angle of a rotating body by detecting a magnetic field generated from a magnetic field generation unit rotatable integrally with the rotating body that rotates about a predetermined rotation axis and including a first surface, the outer periphery of which has a substantially circular shape, a second surface, the outer periphery of which has a substantially circular shape and is positioned opposite to the first surface, and a side surface connecting the outer periphery of the first surface and the outer periphery of the second surface. The rotation angle detection device includes a magnetic field detection unit that detects a magnetic field generated from the magnetic field generation unit and a magnetic field transmission unit capable of covering a portion of the magnetic field generation unit to form a predetermined gap between the magnetic field detection unit and the magnetic field transmission unit. The magnetic field transmission unit includes at least a first magnetic field transmission unit capable of covering one portion of the side surface at a first side of the magnetic field detection unit. The first magnetic field transmission unit has a first end and a second end, which are ends along the circumferential direction of the magnetic field generation unit. The magnetic field detection unit is provided near the first end of the first magnetic field transmission unit. The magnetic field generated from the magnetic field generation unit includes a first magnetic field component along a first direction and a second magnetic field component along a second direction orthogonal to the first direction. The magnetic field detection unit detects the first magnetic field component and the second magnetic field component.

Aspect 17 of the present disclosure is the rotation angle detection device according to the above-described Aspect 16, wherein the magnetic field transmission unit includes a second magnetic field transmission unit that covers one portion of the side surface at a second side of the magnetic field detection unit. The second magnetic field transmission unit has a first end and a second end, which are two ends along the circumferential direction of the magnetic field generation unit. The magnetic field transmission unit is provided such that the magnetic field detection unit is located between the first end of the first magnetic field transmission unit and the first end of the second magnetic field transmission unit.

Aspect 18 of the present disclosure is an electric control device comprising the rotation angle detection device according to any one of the above-described Aspects 1 through 17.

Aspect 19 of the present disclosure is a traction motor unit, including at least the rotation angle detection device according to any one of the above-described Aspects 1 through 17 and a motor, wherein the rotation angle detection device detects the rotation angle of the motor.

Aspect 20 of the present disclosure is a brake booster, including at least the rotation angle detection device according to any one of the above-described Aspects 1 through 17, a motor, and a master cylinder, wherein the rotation angle detection device detects the rotation angle of the motor.

A rotation angle detection device according to embodiments of the present disclosure will be described with reference to the drawings.

In the rotation angle detection device according to some embodiments, an "X-axis, Y-axis and Z-axis" are defined in some of the drawings as needed. Here, the X-axis and the Y-axis are mutually orthogonal directions within a plane parallel to a first surface and second surface of a magnet, and the Z-axis is the axial direction of the rotation axis. Further, "parallel" is a concept that, in addition to two line segments, axes, directions, planes and the like being in a perfectly parallel state, includes such being substantially parallel (the intersection angle being within a range of 5° or less). In addition, "orthogonal" is a concept that, in addition to two line segments, axes, directions, planes and the like being in a perfectly orthogonal state, includes such being substantially orthogonal (the intersection angle being within a range of 85° to 95°).

Figure 6:
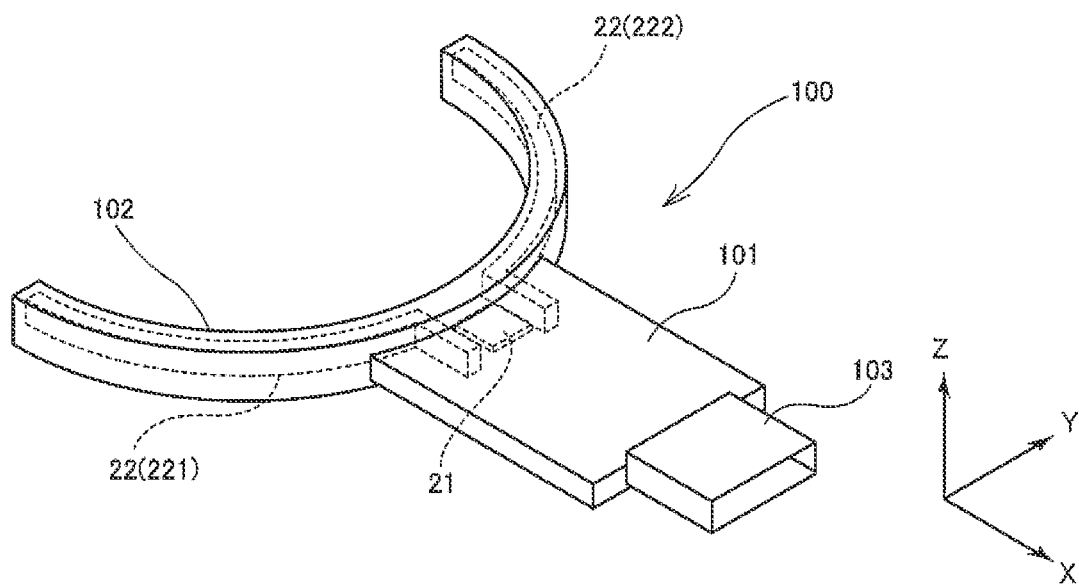
FIG. 6 is a perspective view showing a schematic configuration of a rotation angle sensor module according to one example embodiment of the present disclosure.

A rotation angle detection device 1 according to this embodiment is provided with a magnet 10 magnetized in one direction, and a magnetic field detection device 2 (see FIG. 1, and so forth) having a magnetic field detection unit 21 arranged facing the magnet 10, a magnetic field transmission unit 22 that covers a portion of the magnet 10 to leave a predetermined gap from the magnet 10, and an arithmetic processing unit 23 (see FIG. 6). In this embodiment, the magnetic field detection unit 21 and the arithmetic processing unit 23 may both be integrally formed as one chip (monolithically) or may be formed as one chip by sealing both with resin, or both may be resin-sealed separately and independently. The magnetic field detection device 2 in this embodiment is used to detect the rotation angle of the magnet 10 by being provided to be rotatable integrally with a shaft portion 11, which is a rotating body that rotates around a rotation axis C.

Figure 2A:
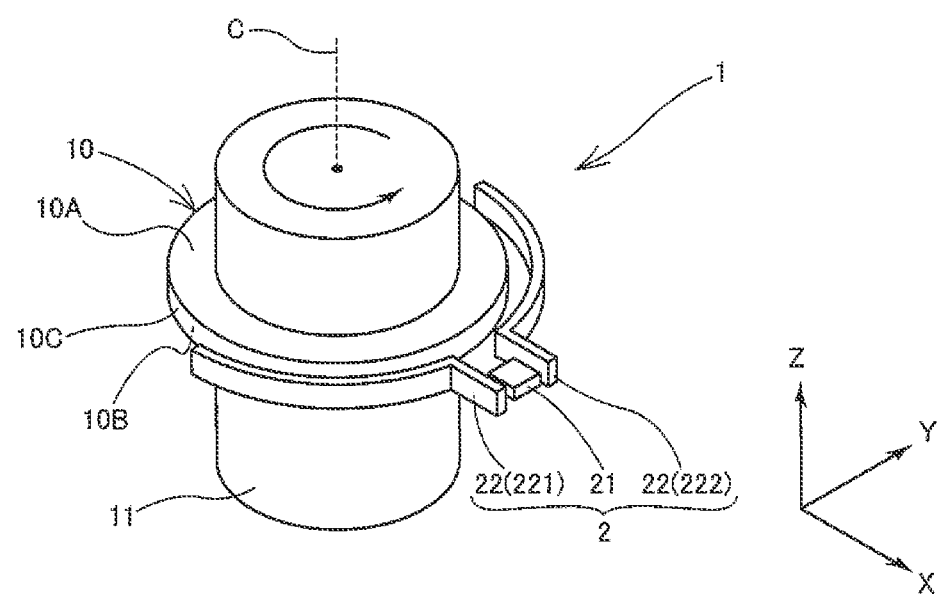
FIG. 2A is a perspective view showing a schematic configuration of another aspect of the rotation angle detection device according to another example embodiment of the present disclosure.
Figure 2B:
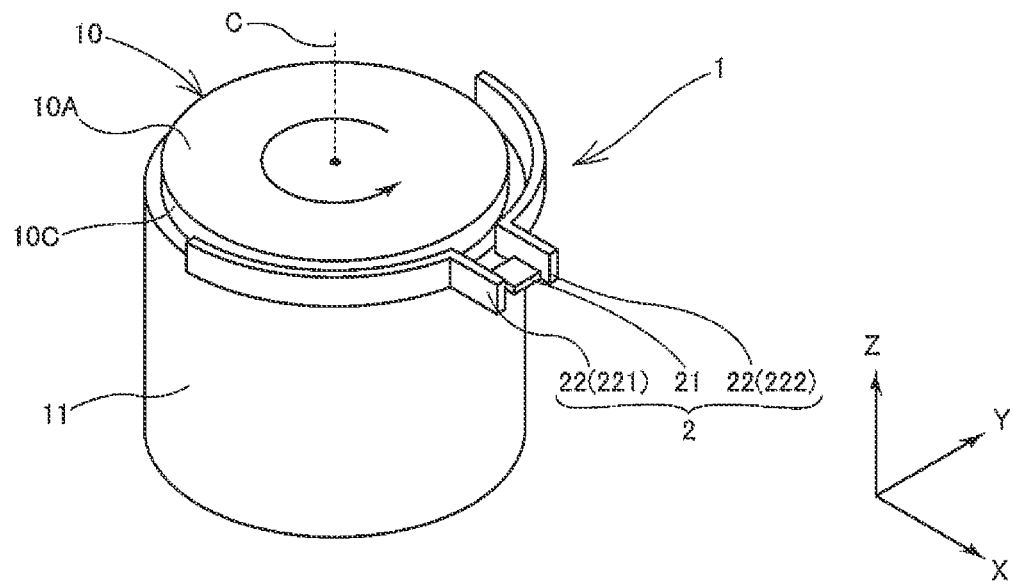
FIG. 2B is a perspective view showing a schematic configuration of another aspect of the rotation angle detection device according to another example embodiment of the present disclosure.

The magnet 10 is provided to be rotatable integrally with the shaft portion 11, which is a rotating body that rotates about the rotation axis C and rotates about the rotation axis C in conjunction with rotation of the shaft portion 11. In this embodiment, the magnet 10 is a ring-shaped magnet and is attached to one end of the shaft portion 11 but is not limited to this configuration. For example, the magnet 10 may be attached in the middle of the shaft portion 11 (see FIG. 2A). Additionally, the magnet 10 may be a circular magnet in a plan view and may be attached to one end of the shaft portion 11 (see FIG. 2B). The magnet 10 functions as a magnetic field generation unit that generates a magnetic field based on the magnetization thereof.

The magnet 10 has a first surface 10A orthogonal to the rotation axis C of the shaft portion 11, a second surface 10B located on the side opposite the first surface 10A, and a side surface 10C that is continuous between the outer peripheral edge of the first surface 10A and the outer peripheral edge of the second surface 10B along the entire circumference. The first surface 10A and the second surface 10B of the magnet 10 are surfaces parallel to the XY plane, and the side surface 10C is a surface parallel to the Z axis. The magnet 10 is attached to one end of the shaft portion 11 so that the centers of gravity (centers) of the first surface 10A and the second surface 10B are aligned with the rotation axis C of the shaft portion 11 (see FIG. 1). The magnet 10 is magnetized in one direction orthogonal to the rotation axis C of the shaft portion 11 (one direction parallel to the first surface 10A and the second surface 10B).

Figure 3:
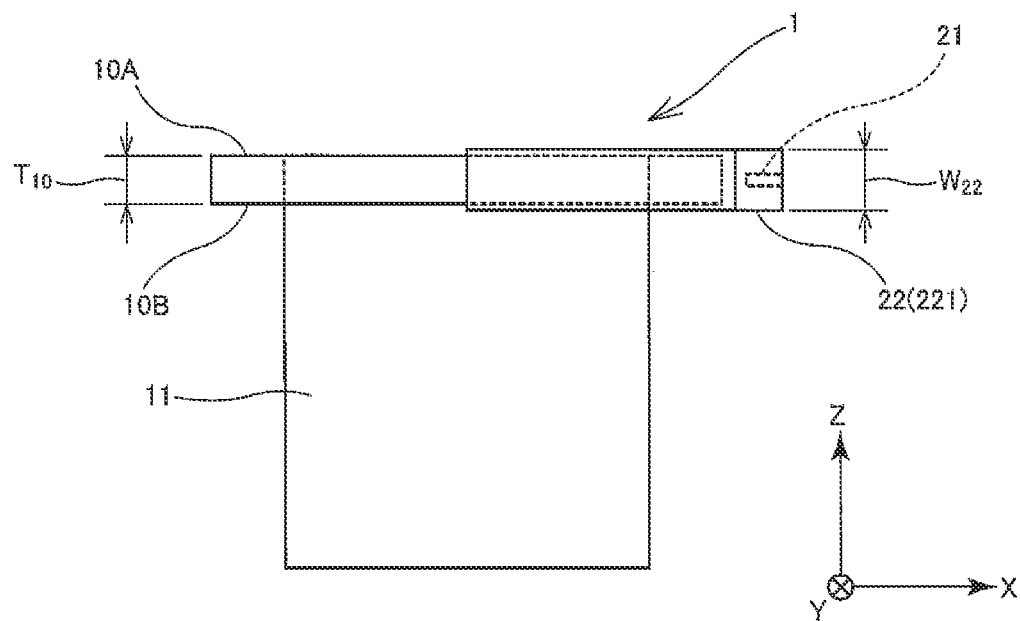
FIG. 3 is a side view showing a schematic configuration of a rotation angle detection device according to one example embodiment of the present disclosure.

As shown in FIG. 3, the thickness $T_{10}$ (the length in the Z-axis direction) of the magnet 10 is not particularly limited, and can be set to, for example, 2 to 10 mm. If the thickness $T_{10}$ of the magnet 10 is relatively thin, there is a concern that securing the minimum required magnetic field for normal operation of the magnetic field detection unit 21 could become difficult when the axial direction of the shaft 11 wobbles. If the thickness $T_{10}$ of the magnet 10 is relatively thick, there is a concern that the manufacturing cost of the rotation angle detection device 1 will increase, the rotation angle detection device 1 will become relatively heavy, and the installation space for the rotation angle detection device 1 will increase.

Figure 5A:
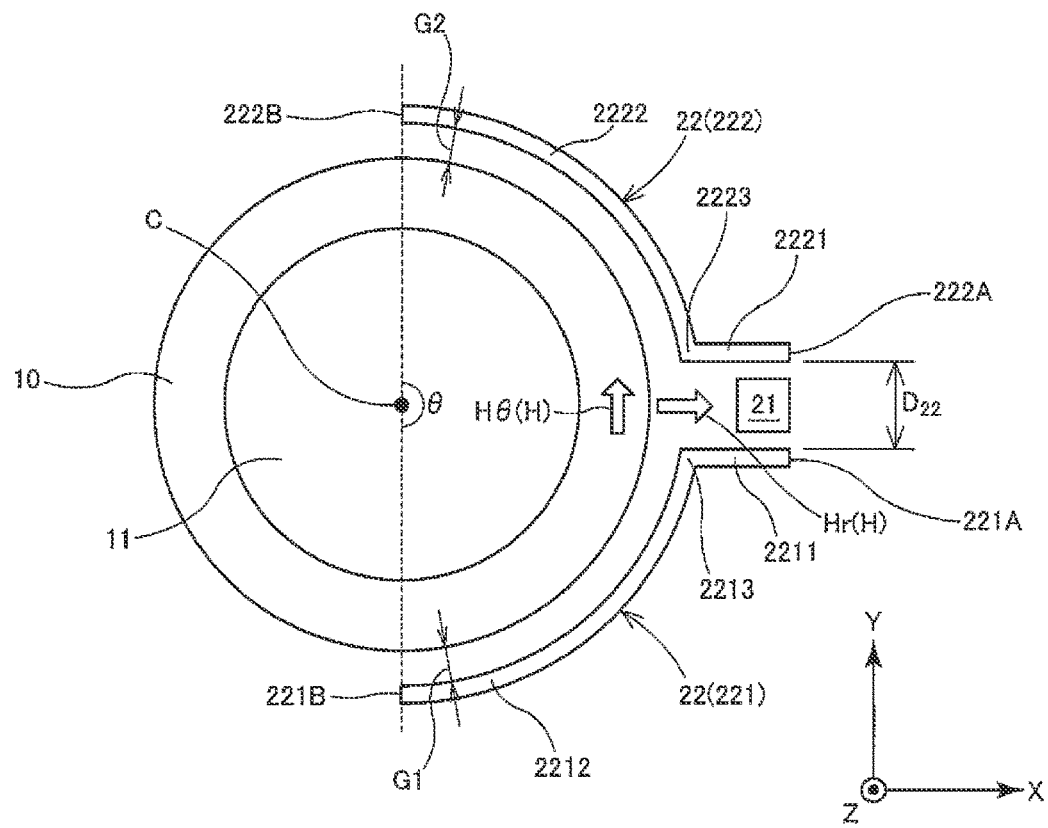
FIG. 5A is a plan view showing a schematic configuration of a rotation angle detection device according to one example embodiment of the present disclosure.

The magnetic field H generated by the magnet 10 includes a first magnetic field component Hr along a first direction (the radial direction of the magnet 10) and a second magnetic field component Hθ along a second direction (the circumferential direction of the magnet 10), which is orthogonal to the first direction (see FIG. 5A). The magnetic field detection unit 21 in this embodiment should be capable of detecting the first magnetic field component Hr and the second magnetic field component Hθ impressed on the magnetic field detection unit 21. For example, the magnetic field detection unit 21 in this embodiment includes a first magnetic field detection unit 211 capable of detecting the first magnetic field component Hr and a second magnetic field detection unit 212 capable of detecting the second magnetic field component H. The magnetic field detection unit 21 (the first magnetic field detection unit 211 and the second magnetic field detection unit 212) may include, for example, a magnetoresistive effect element such as a TMR element or a GMR element, a Hall element, or the like.

Figure 4:
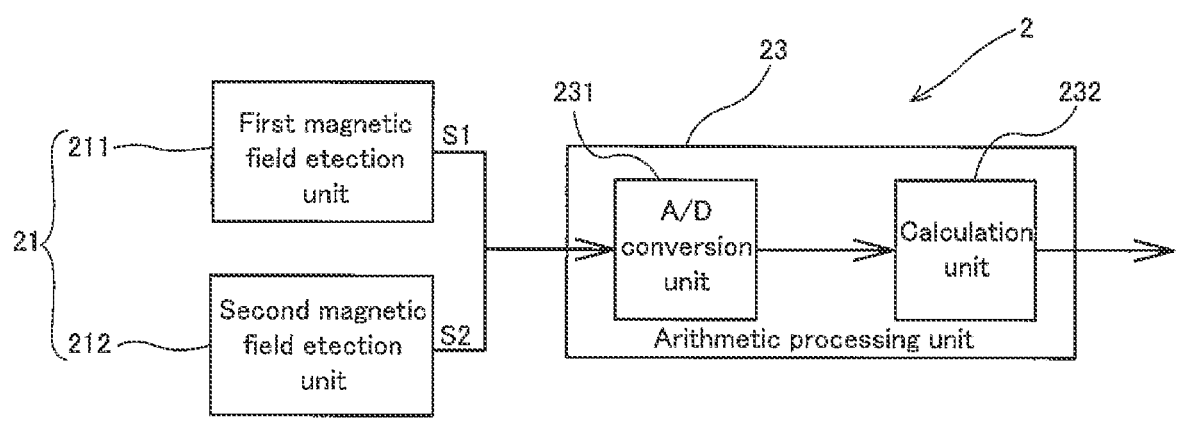
FIG. 4 is a block diagram showing a schematic configuration of a magnetic field detection device according to one example embodiment of the present disclosure.

The magnetic field detection unit 21 (the first magnetic field detection unit 211 and the second magnetic field detection unit 212) outputs an electric signal representing fluctuation of the impressed magnetic field to the arithmetic processing unit 23 (see FIG. 4).

The arithmetic processing unit 23 should include an ND (analog-digital) conversion unit 231 that converts the analog signal output from the magnetic field detection unit 21 into a digital signal, and a calculation unit 232 that processes the digital signal converted to digital by the ND conversion unit 231 (see FIG. 4).

The signal (analog signal) output from the magnetic field detection unit 21 is converted into a digital signal by the ND conversion unit 231, and the digital signal is input into the calculation unit 232. The calculation unit 232 generates a corrected signal by performing correction processing to correct the digital signal converted from the analog signal by the ND conversion unit 231 and performs arithmetic processing based on the corrected signal. The calculation unit 232 comprises, for example, a microcomputer, an Application Specific Integrated Circuit (ASIC), or the like.

As shown in FIG. 5A, the magnetic field transmission unit 22 includes a first magnetic field transmission unit 221 that covers a portion of the side surface 10C on one side of the magnet 10 when viewed from the magnetic field detection unit 21, and a second magnetic field transmission unit 222 that covers a portion of the side surface 10C on the other side. The magnetic field transmission unit 22 functions as a yoke that transmits the magnetic field generated by the magnet 10 to the magnetic field detection unit 21 and impresses the magnetic field on the magnetic field detection unit 21. Because the magnetic field transmission unit 22 in this embodiment covers a portion of the side surface 10C of the magnet 10, variations in the strength of the magnetic field impressed on the magnetic field detection unit 21 accompanying rotation of the magnet 10 can be reduced, so the rotation angle detection error (angular error) can be reduced. In addition, because the magnetic field transmission unit 22 covers a portion of the side surface 10C of the magnet 10, it is possible for the minimum value of the strength of the magnetic field impressed on the magnetic field detection unit 21 accompanying rotation of the magnet 10 to become relatively large, and as a result, it becomes possible for the magnet 10 to be relatively small, and to employ relatively inexpensive materials as the materials comprising the magnet 10.

The first magnetic field transmission unit 221 and the second magnetic field transmission unit 222 have first ends 221A and 222A and second ends 221B and 222B, respectively, which are both ends along the circumferential direction of the side surface 10C of the magnet 10. The magnetic field detection unit 21 may be located between the first end 221A of the first magnetic field transmission unit 221 and the first end 222A of the second magnetic field transmission unit 222. The magnetic field detection unit 21 need not be located between the first end 221A of the first magnetic field transmission unit 221 and the first end 222A of the second magnetic field transmission unit 222.

The first magnetic field transmission unit 221 and the second magnetic field transmission unit 222 are respectively composed of first portions 2211 and 2221 including the first ends 221A and 222A and second portions 2212 and 2222 including the second ends 221B and 222B. The first portions 2211 and 2221 are portions bent in a direction (+X direction) away from the side surface 10C of the magnet 10 in the XY plane via bent portions 2213 and 2223, and the second portions 2212 and 2222 are portions facing the side surface 10C of the magnet 10.

The length of the first portion 2211 of the first magnetic field transmission unit 221 and the length of the first portion 2221 of the second magnetic field transmission unit 222 may be the same or may differ. By having the lengths of the first portions 2211 and 2221 be the same, the component of the magnetic field impressed on the magnetic field detection unit 21 along the X direction (hereinafter sometimes referred to as the "X component") and the component along the Y direction (hereinafter sometimes referred to as the "Y component") have good balance. The length of the first portions 2211 and 2221 refers to the distance parallel to the X-axis between the bent portions 2213 and 2223 and the first ends 221A and 222A.

The positions of the first ends 221A and 222A of the first magnetic field transmission unit 221 and the second magnetic field transmission unit 222 may be positions that include therebetween at least part of the magnetic field detection unit 21 (see FIG. 5B) but preferably are positions that include therebetween the entire magnetic field detection unit 21 (see FIG. 5A, etc.). That is, a portion of the magnetic field detection unit 21 may be exposed when viewed along the Y-axis direction (see FIG. 5B) but preferably the magnetic field detection unit 21 is hidden by the first portion 2211 of the first magnetic field transmission unit 221 or the first portion 2221 of the second magnetic field transmission unit 222 (see FIG. 5A) when viewed in the Y direction. By having the magnetic field detection unit 21 be hidden when viewed along the Y-axis direction (having the magnetic field detection unit 21 be hidden by the first portions 2211 and 2221), the balance between the X component and the Y component of the magnetic field impressed on the magnetic field detection unit 21 can be improved.

A distance $D_{22}$ (a distance in the Y-axis direction) between the first ends 221A and 222A of the first magnetic field transmission unit 221 and the second magnetic field transmission unit 222 is preferably a distance such that the magnetic field detection unit 21 can be positioned between the first ends 2211 and 2221, and for example should be about 3 to 15 mm.

An angle θ formed by a line segment connecting the rotation axis C and the second end 221B of the first magnetic field transmission unit 221 and a line segment connection the rotation axis C and the second end 222B of the second magnetic field transmission unit 222, when viewed along the rotation axis C (the Z-axis direction), is preferably not more than 180° in mechanical angle, and more preferably at least 60° and not more than 180°, and more preferably at least 100° and not more than 180°. When the angle θ is 180° or less, the angular error can be effectively reduced. In addition, by having the angle θ be 180° or less, a below-described rotation angle sensor module 100 (see FIG. 8) can be attached to and detached from the shaft 11 in the direction orthogonal to the rotation axis C. Furthermore, when the angle θ is less than 60°, there is a concern that the angular error may increase.

When the angle θ is divided into a first angle θ1 formed by a line segment connecting the rotation axis C and the second end 221B of the first magnetic field transmission unit 221 and a line segment connecting the rotation axis C and the magnetic field detection unit 21, and a second angle θ2 formed by a line segment connecting the rotation axis C and the second end 222B of the second magnetic field transmission unit 222 and a line segment connecting the rotation axis C and the magnetic field detection unit 21, when viewed along the rotation axis C (the Z-axis direction), the first angle θ1 and the second angle θ2 may be different (see FIG. 5C), but are preferably the same (see FIG. 5A, etc.). By making the first angle θ1 and the second angle θ2 the same, the balance of the magnetic field strength transmitted from the first magnetic field transmission unit 221 and the second magnetic field transmission unit 222 to the magnetic field detection unit 21 is improved. In this embodiment, the first angle θ1 and the second angle θ2 being the same includes not only when the angles 81 and 82 are completely the same, but also when the difference (absolute value) between the angles 81 and 82 is more than 0° and not more than about 5°.

The second portions 2212 and 2222 of the first magnetic field transmission unit 221 and the second magnetic field transmission unit 222 each have curved shapes that follow the curved shape of the side surface 10C of the magnet 10 and form uniform gaps G1 and G2 from the side surface 10C of the magnet 10 (see FIG. 5A, etc.). The second portions 2212 and 2222 of the first magnetic field transmission unit 221 and the second magnetic field transmission unit 222 may each have a bent shape that forms uneven gaps G1 and G2 from the side surface 10C of the magnet 10 (see FIG. 5D). The gaps G1 and G2 mean the lengths between the side surface 10C and the second portions 2212, 2222 in a direction orthogonal to the tangential plane of the side surface 10C of the magnet 10 (tangent to the outer periphery of the first surface 10A) when viewed along the rotation axis C (the Z-axis). The gaps G1 and G2 should be lengths that allow the magnetic field generated by the magnet 10 to be impressed on the magnetic field detection unit 21 with sufficient strength via the magnetic field transmission unit 21 (the first magnetic field transmission unit 221 and the second magnetic field transmission unit 222), and lengths such that the shaft portion 11 (rotating body) does not contact the magnetic field transmission unit 22 or a second molded section 102 (see FIG. 6) that holds the magnetic field transmission unit 22, even if the rotation axis C is eccentric, and should be, for example, about 0.5 to 5 mm.

As shown in FIG. 3, $W_{22}$ (the length in the Z-axis direction) of the magnetic field transmission unit 22 is not particularly limited, but is preferably at least as great as the thickness of the magnetic field detection unit 21, and for example should be about 1 to 5 mm. If the width $W_{22}$ of the magnetic field transmission unit 22 is less than the thickness of the magnetic field detection unit 21, the magnetic field detection unit 21 and the magnetic field transmission unit 22 need to be assembled with high accuracy.

The thickness $T_{22}$ (see FIG. 5B) of the magnetic field transmission unit 22 (the first magnetic field transmission unit 221 and the second magnetic field transmission unit 222) is not particularly limited, but should be, for example, about 0.6 to 3 mm.

The calculation unit 232 (see FIG. 4) corrects the signal output from the magnetic field detection unit 21 and calculates a detection signal. The magnetization direction of a magnetization fixed layer 42 of a magnetoresistive effect element 40 in the first magnetic field detection unit 211 and the magnetization direction of a magnetization fixed layer 42 of a magnetoresistive effect element 40 in the second magnetic field detection unit 212 are mutually orthogonal. Ideally, the phase of the signal output from the first magnetic field detection unit 211 and the phase of the signal output from the second magnetic field detection unit 212 differ by ¼ of the signal period, that is, π/2 (90°). The calculation unit 232 calculates a detection angle θs based on an output signal S1 from the first magnetic field detection unit 211 and an output signal S2 from the second magnetic field detection unit 212 using Formula (1) below. Here, "atan" stands for arctangent.

$$\theta s = \mathrm{atan}(S1/S2) \tag{1}$$

The term "atan(S1/S2)" in Formula (1) represents the arctangent calculation for finding the detection angle θs. Within a range of 360°, there are two values differing by 180° that are solutions for the detection angle θs in Formula (1). However, from the combination of positive and negative signs of the output signal S1 and output signal S2, it is possible to determine which of the two solutions for the detection angle θs in Formula (1) is the true value of the detection angle θs. That is, when the output signal S1 has a positive value, the detection angle θs is greater than 0° and less than 180°. When the output signal S1 has a negative value, the detection angle θs is greater than 180° and less than 360°. When the output signal S2 has a positive value, the detection angle θs is within the range of least 0° and less than 90° and greater than 270° and less than 360°. When the output signal S2 has a negative value, the detection angle θs is greater than 90° and less than 270°. The calculation unit 232 finds the detection angle θs within a 360° range from Formula (1) and a judgement of the combination of positive and negative signs of the output signal S1 and the output signal S2 as described above. The calculation unit 232 may correct the detection angle θs obtained in this way, for example, using a lookup table (LUT) or the like. Through this, the angular error included in the detection angle θs can be further reduced.

The magnetic field detection device 2 according to this embodiment may comprise a rotation angle sensor module 100 integrally molded with resin or the (see FIG. 6). In the aspect shown in FIG. 6, the rotation angle sensor module 100 includes a first molded section 101 holding the magnetic field detection unit 21 and the arithmetic processing unit 23 mounted on a substrate (omitted from the drawing), a second molded section 102 holding the magnetic field transmission unit 22, and a third molded section 103 forming a connector portion (omitted from the drawing) electrically connected to the substrate. This kind of rotation angle sensor module 100 can be easily attached, from a direction orthogonal to the rotation axis C, to the shaft portion 11 where the magnet 10 is provided. In the aspect shown in FIG. 6, the first molded section 101 and the second molded section 102 are integrated, but the invention is not limited to this aspect. For example, the first molded section 101 and the second molded section 102 may be separate bodies, or the rotation angle sensor module 100 may be provided with the second molded section 102 for molding at least the magnetic field transmission unit 22.

Figure 8A:
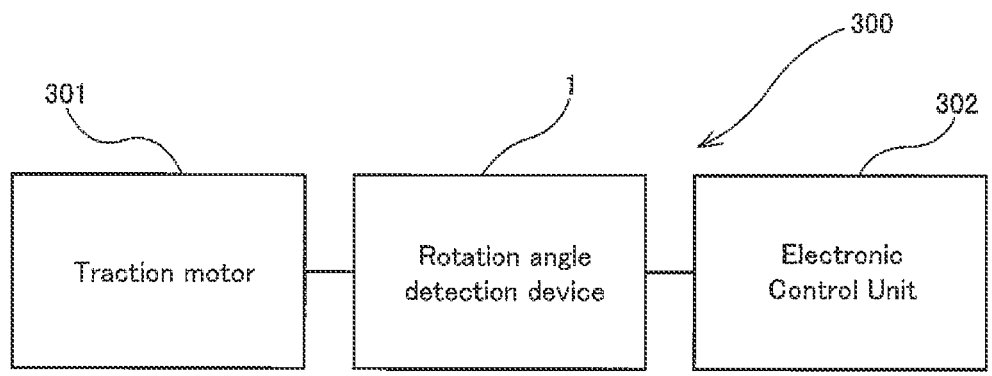
FIG. 8A is a block diagram showing a schematic configuration of a traction motor unit according to one example embodiment of the present disclosure.
Figure 8B:
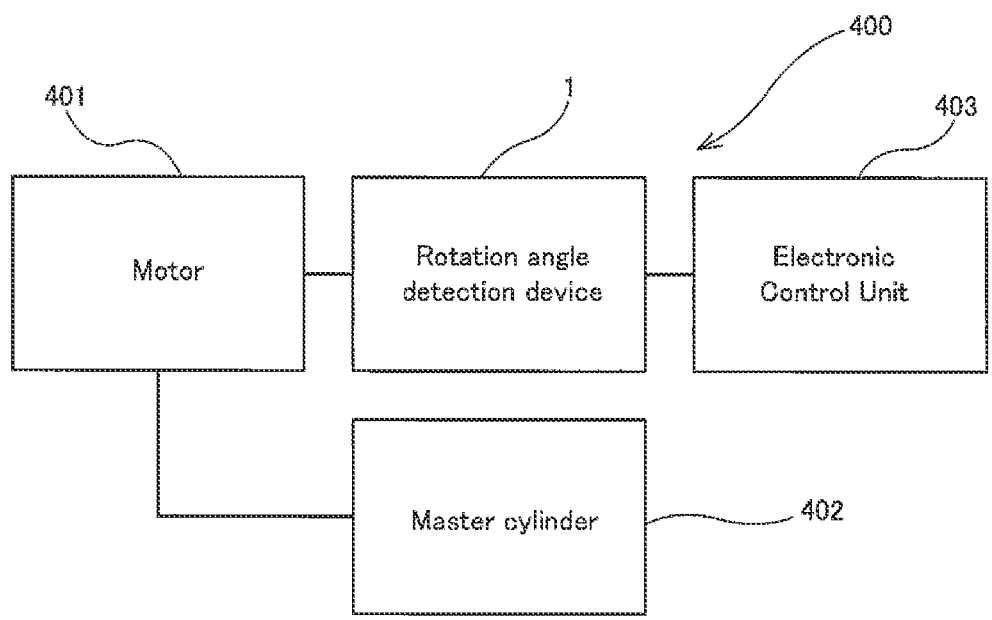
FIG. 8B is a block diagram showing a schematic configuration of a brake booster according to one example embodiment of the present disclosure.

The rotation angle detection device 1 according to this embodiment can be provided in an electric control device. Examples of the electric control device in this embodiment include a traction motor unit, a brake booster, an electric power steering device, and the like. A traction motor unit 300 in this embodiment includes a traction motor 301, the rotation angle detection device 1, and an ECU (Electronic Control Unit) 302, for example as shown in FIG. 8A. In this traction motor unit 300, the rotation angle of the traction motor 301 is detected by the rotation angle detection device 1, and information about the rotation angle is transmitted to the ECU 302. Further, a brake booster 400 in this embodiment includes a motor 401, the rotation angle detection device 1, a master cylinder 402, and an ECU (Electronic Control Unit) 403, for example as shown in FIG. 8B. In this brake booster 400, when a brake pedal (omitted from the drawing) is operated, the motor 401 rotates, the rotation angle of the motor 401 is detected by the rotation angle detection device 1, and information about the rotation angle is transmitted to the ECU 403. As described above, the rotation angle detection device 1 according to this embodiment can detect the rotation angle with high accuracy, and therefore is particularly useful as a sensor for detecting the rotation angle of a motor or steering wheel in the above-described electric control device.

In the rotation angle detection device 1 according to this embodiment, the magnetic field transmission unit 22 (the first magnetic field transmission unit 221 and the second magnetic field transmission unit 222) is provided to cover the side surface 10C of the magnet 10 such that the magnetic field detection unit 21 is located therebetween, and through this the strength distribution of the magnetic field impressed on the magnetic field detection unit 21 can be stabilized, so that the angular error included in the detection angle θs found as described above can be effectively reduced. Therefore, in the above-described electric control device, control can be performed with high accuracy based on the detection angle θs found by the rotation angle detection device 1.

The embodiment described above was described to facilitate understanding of the present disclosure and was not described to limit the present disclosure. Accordingly, each element disclosed in the above embodiment is intended to include all design modifications and equivalents falling within the technical scope of the present disclosure. In addition, the dimensions and layouts of each element disclosed in the above embodiment are examples and are not intended to be limiting.

Figure 7A:
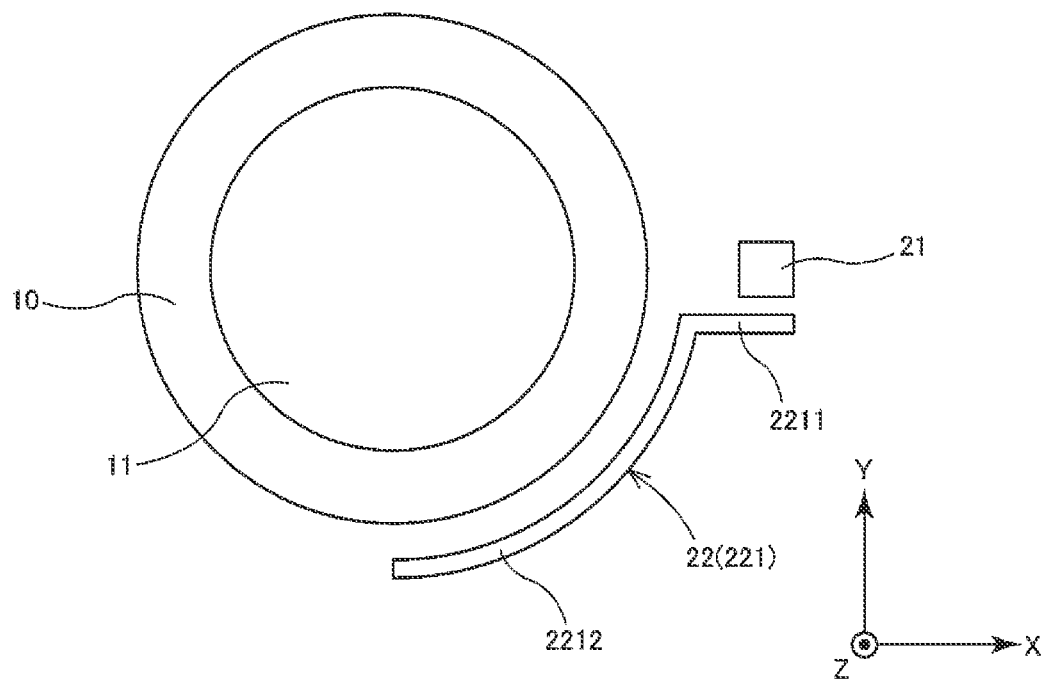
FIG. 7A is a plan view showing another aspect of the schematic configuration of the rotation angle detection device according to one example embodiment of the present disclosure.

In the rotation angle detection device 1 according to the above-described embodiment, the magnetic field transmission unit 22 may have the first magnetic field transmission unit 221 that covers a portion of the side surface 10C of one side of magnet 10 when viewed from the magnetic field detection device 21 and not have the second magnetic field transmission unit 222 that covers a portion of the side surface 10C on the other side (see FIG. 7A). In the aspect shown in FIG. 7A, the first magnetic field transmission unit 221 should be positioned near the first end 221A of the first magnetic field transmission unit 221 to the extent that the magnetic field transmitted by the magnetic field transmission unit 221 can be impressed with sufficient strength. In addition, the magnetic field transmission unit 22 (the first magnetic field transmission unit 221 and the second magnetic field transmission unit 222) may have only the second portions 2212 and 2222 facing the side surface 10C of the magnet 10 (see FIGS. 7B and 7C). In the aspects shown in FIG. 7B and FIG. 7C, the magnetic field detection unit 21 may be located between the first end 221A of the first magnetic field transmission unit 221 and the first end 222A of the second magnetic field transmission unit 222 (see FIG. 7B) or may not be located therebetween (see FIG. 7C).

The rotation angle detection device 1 according to the above embodiment may be provided with two magnetic field detection units 21 and 21' in order to ensure redundancy of the magnetic field detection unit 21. In this case, the two magnetic field detection units 21 and 21' may be aligned in a direction parallel to the rotation axis C (the Z-axis direction) (see FIG. 7D), or may be aligned in a direction parallel to the circumferential direction of the magnet 10 (the Y-axis direction) (see FIG. 7E), or may be arranged in a direction parallel to the radial direction of the magnet 10 (the X-axis direction) (see FIG. 7F). By arranging the two magnetic field detection units 21 and 21' along any one of the X-axis, the Y-axis or the Z-axis, the angular errors contained in the signals output from the two magnetic field detectors 21 and 21' can be made substantially the same.

EXAMPLES

The present disclosure will be described in more detail below with reference to examples or the like, but the present disclosure is not limited to the following examples or the like.

Test Example 1

Figure 9:
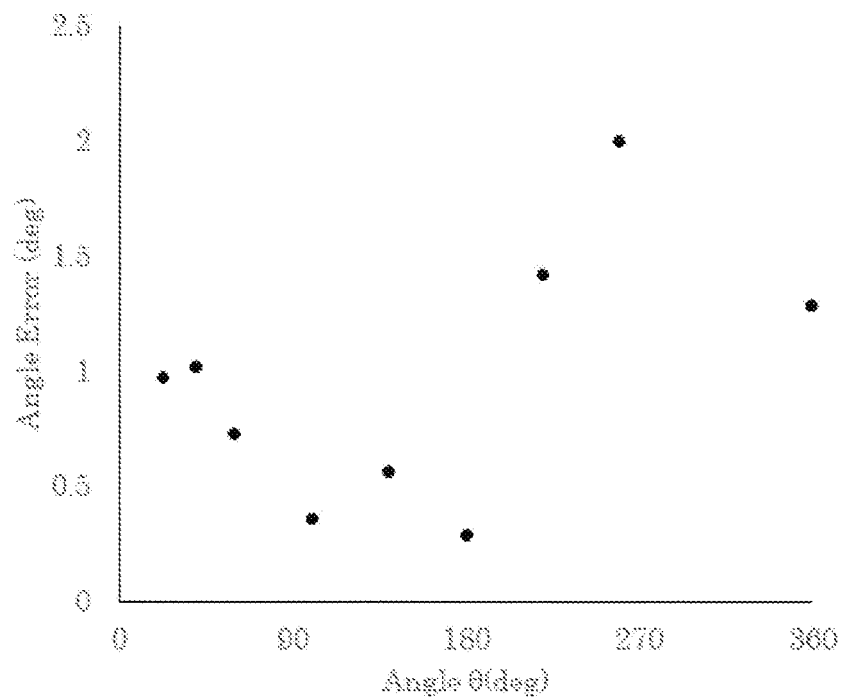
FIG. 9 is a graph showing results of Test Example 1.

In the rotation angle detection device 1 having the configuration shown in FIG. 1 and in which the diameter of the magnet 10 is taken to be 54 mm, the thickness $T_{10}$ of the magnet 10 is taken to be 5 mm, the magnetic field detection unit 21 is placed 5 mm away from the side of the magnet 10 in the X-axis direction, and the width $W_{22}$ of the magnetic field transmission unit 22 is taken to be 6 mm, the effect on the angular error included in the detection angle θs in the rotation angle detection device 1 caused by the coverage range (angle θ) of the side surface 13 of the magnet 10 by the magnetic field transmission unit 22 when the angle θ is caused to change within a range of 22.5° to 360° was found through simulation. The results are shown in FIG. 9. In the graph shown in FIG. 9, the horizontal axis is the angle θ (deg), and the vertical axis is the angular error (deg) in the rotation angle detection device 1.

From the results shown in FIG. 9, it was confirmed that the angular error included in the detection angle θs can be reduced by providing the magnetic field transmission unit 22 covering a portion of the side surface 10C of the magnet 10. Additionally, it was confirmed that the angular error can be further reduced when the angle θ is 60° to 180°, and more preferably 100° to 180°.

Test Example 2

Sample 1

Figure 10:
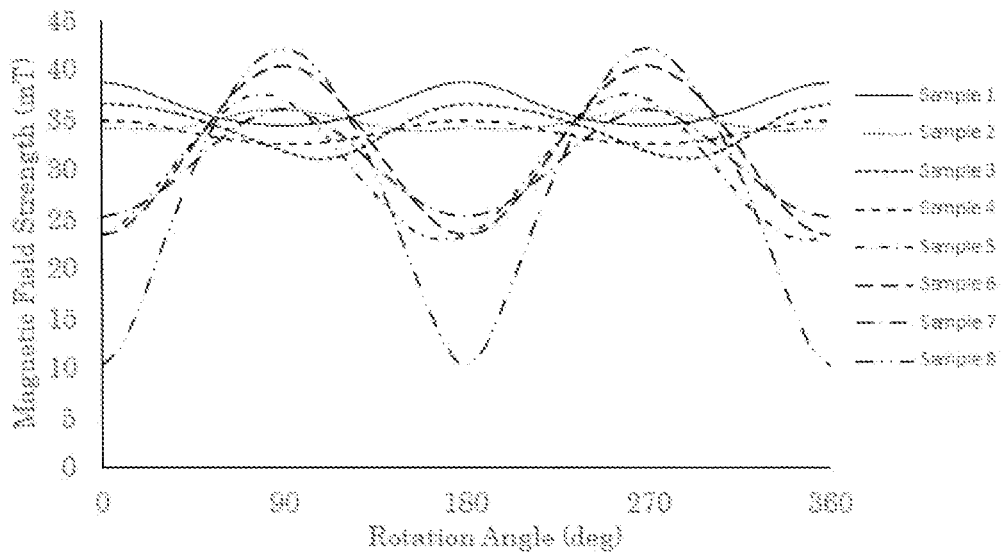
FIG. 10 is a graph showing results of Test Example 2.
Figure 11:
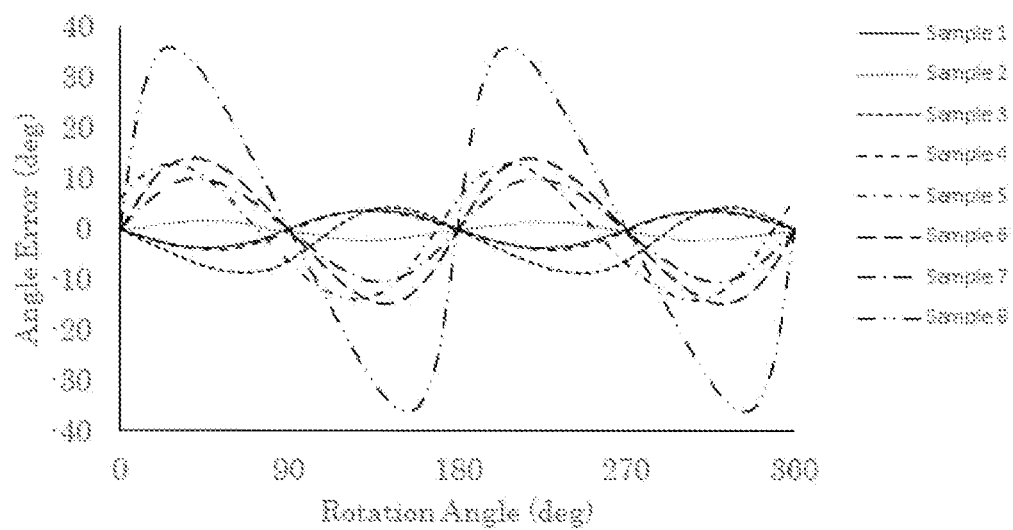
FIG. 11 is a graph showing results of Test Example 2.

With Sample 1, in the rotation angle detection device 1 (angle θ=180°) of Test Example 1, the strength (mT) of the magnetic field impressed on the magnetic field detection unit 21 when the magnet 10 is rotated (the composite magnetic field of the first magnetic field component Hr and the second magnetic field component Hθ) and the angular error (deg) included in the detection angle θs in the rotation angle detection unit 1 were found through simulation. The results are shown in FIG. 10 and FIG. 11.

Sample 2

Figure 5B:
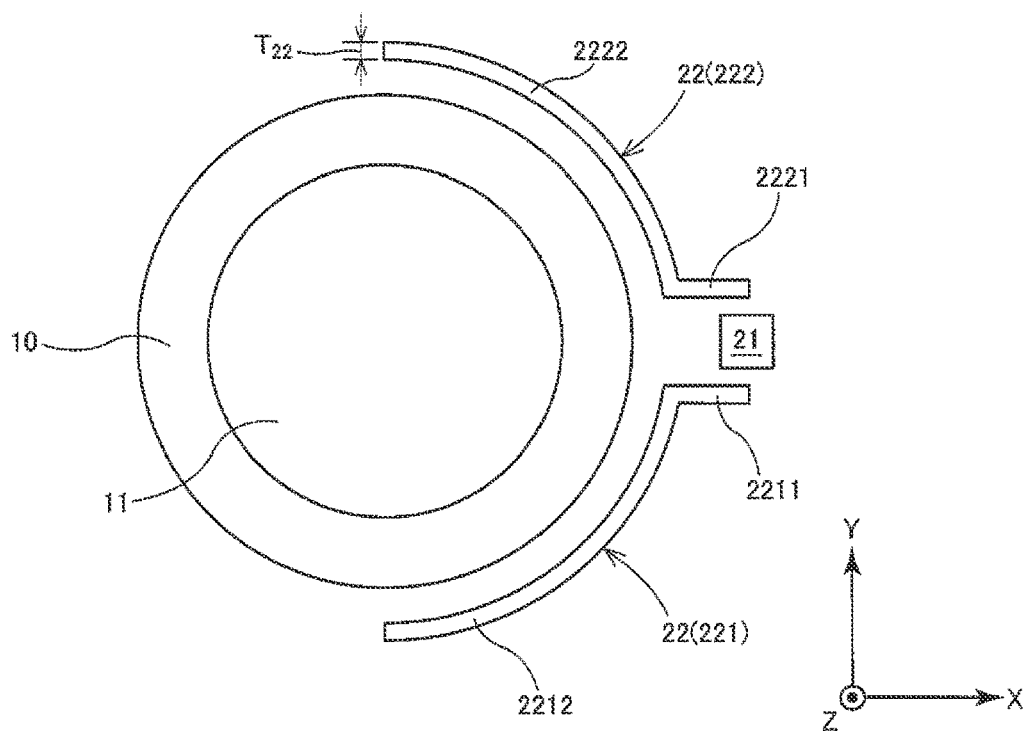
FIG. 5B is a plan view showing a schematic configuration of another aspect of the rotation angle detection device according to one example embodiment of the present disclosure.

With Sample 2, except for changing the magnetic field transmission unit 22 to the aspect shown in FIG. 5B, the strength (mT) of the magnetic field impressed on the magnetic field detection unit 21 when the magnet 10 is rotated (the composite magnetic field of the first magnetic field component Hr and the second magnetic field component Hθ) and th e angular error (deg) included in the detection angle θs in the rotation angle detection u nit 1 were found through simulation the same as in Sample 1. The results are shown in FIG. 10 and FIG. 11.

Sample 3

Figure 5C:
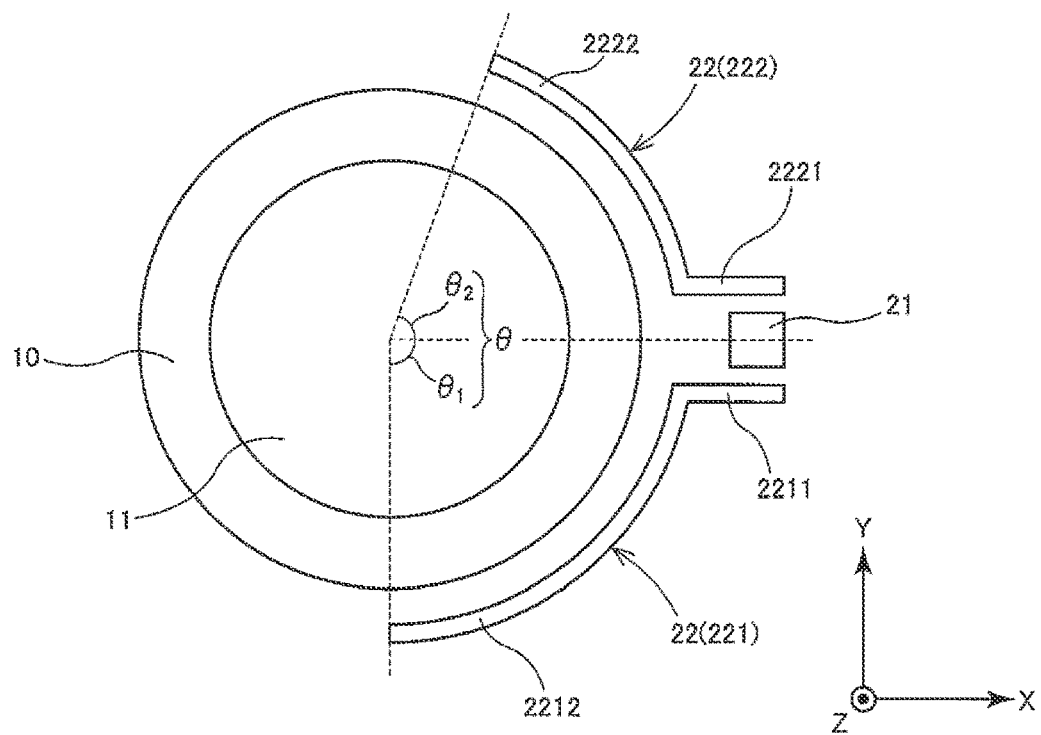
FIG. 5C is a plan view showing a schematic configuration of another aspect of the rotation angle detection device according to one example embodiment of the present disclosure.

With Sample 3, except for changing the magnetic field transmission unit 22 to the aspect shown in FIG. 5C (first angle θ1=90°, second angle θ2=70°), the strength (mT) of the magnetic field impressed on the magnetic field detection unit 21 when the magnet 10 is rotated (the composite magnetic field of the first magnetic field component Hr and the second magnetic field component Hθ) and the angular error (deg) included in the detection angle θs in the rotation angle detection unit 1 were found through simulation the same as in Sample 1. The results are shown in FIG. 10 and FIG. 11.

Sample 4

Figure 5D:
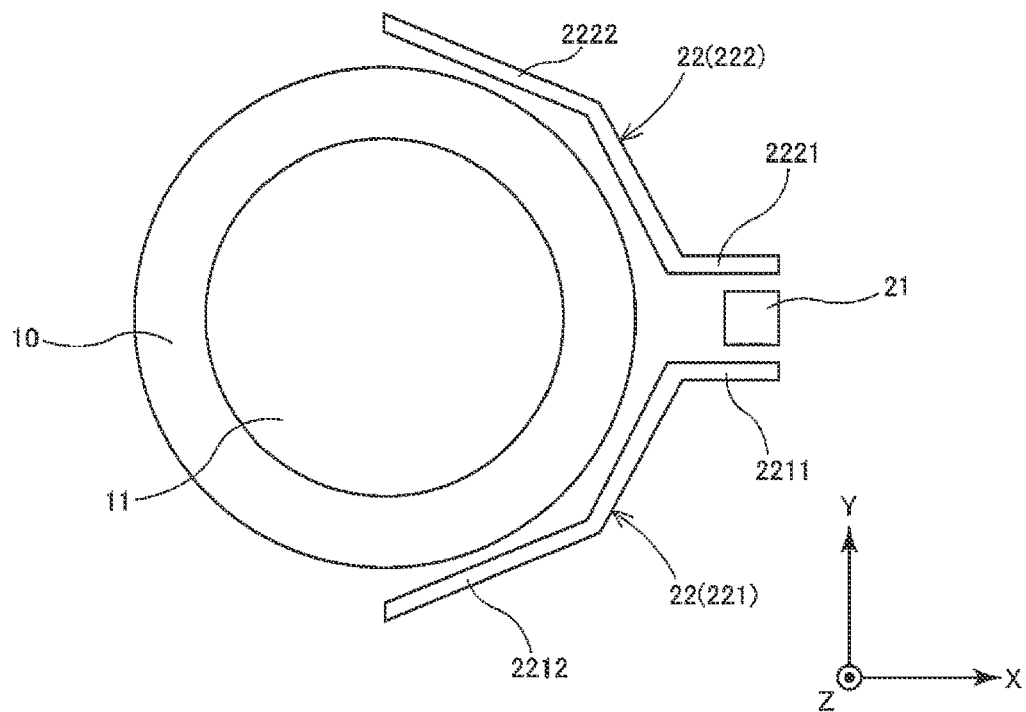
FIG. 5D is a plan view showing a schematic configuration of another aspect of the rotation angle detection device according to one example embodiment of the present disclosure.

With Sample 4, except for changing the magnetic field transmission unit 22 to the aspect shown in FIG. 5D, the strength (mT) of the magnetic field impressed on the magnetic field detection unit 21 when the magnet 10 is rotated (the composite magnetic field of the first magnetic field component Hr and the second magnetic field component Hθ) and the angular error (deg) included in the detection angle θs in the rotation angle detection unit 1 were found through simulation the same as in Sample 1. The results are shown in FIG. 10 and FIG. 11.

Sample 5

With Sample 5, except for changing the magnetic field transmission unit 22 to the aspect shown in FIG. 7A, the strength (mT) of the magnetic field impressed on the magnetic field detection unit 21 when the magnet 10 is rotated (the composite magnetic field of the first magnetic field component Hr and the second magnetic field component Hθ) and the angular error (deg) included in the detection angle θs in the rotation angle detection unit 1 were found through simulation the same as in Sample 1. The results are shown in FIG. 10 and FIG. 11.

Sample 6

Figure 7B:
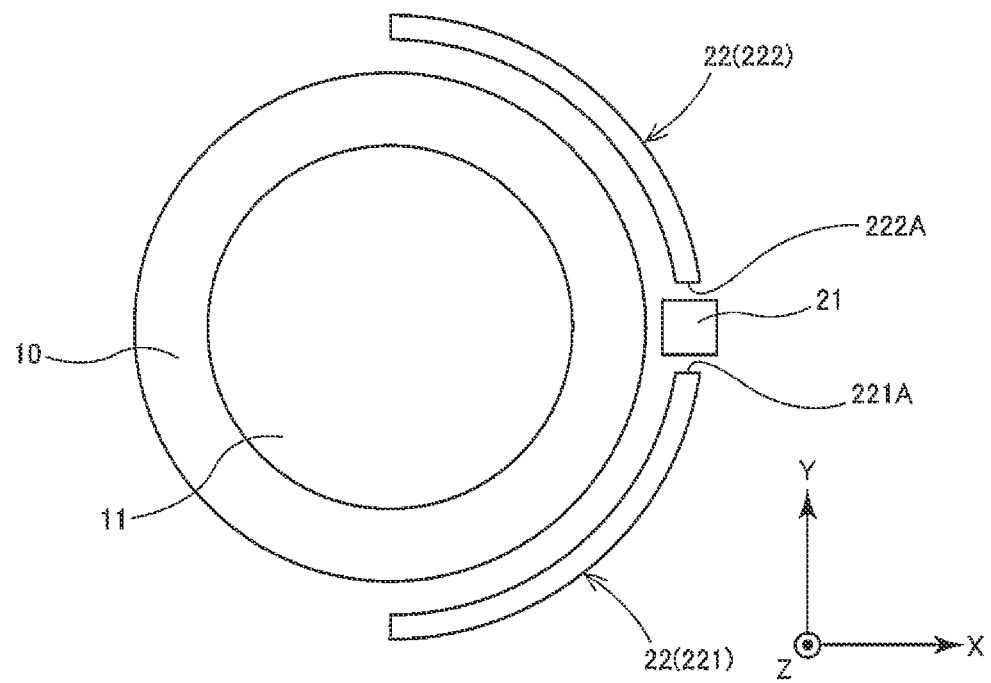
FIG. 7B is a plan view showing another aspect of the schematic configuration of the rotation angle detection device according to one example embodiment of the present disclosure.

With Sample 6, except for changing the magnetic field transmission unit 22 to the aspect shown in FIG. 7B, the strength (mT) of the magnetic field impressed on the magnetic field detection unit 21 when the magnet 10 is rotated (the composite magnetic field of the first magnetic field component Hr and the second magnetic field component Hθ) and the angular error (deg) included in the detection angle θs in the rotation angle detection unit 1 were found through simulation the same as in Sample 1. The results are shown in FIG. 10 and FIG. 11.

Sample 7

Figure 7C:
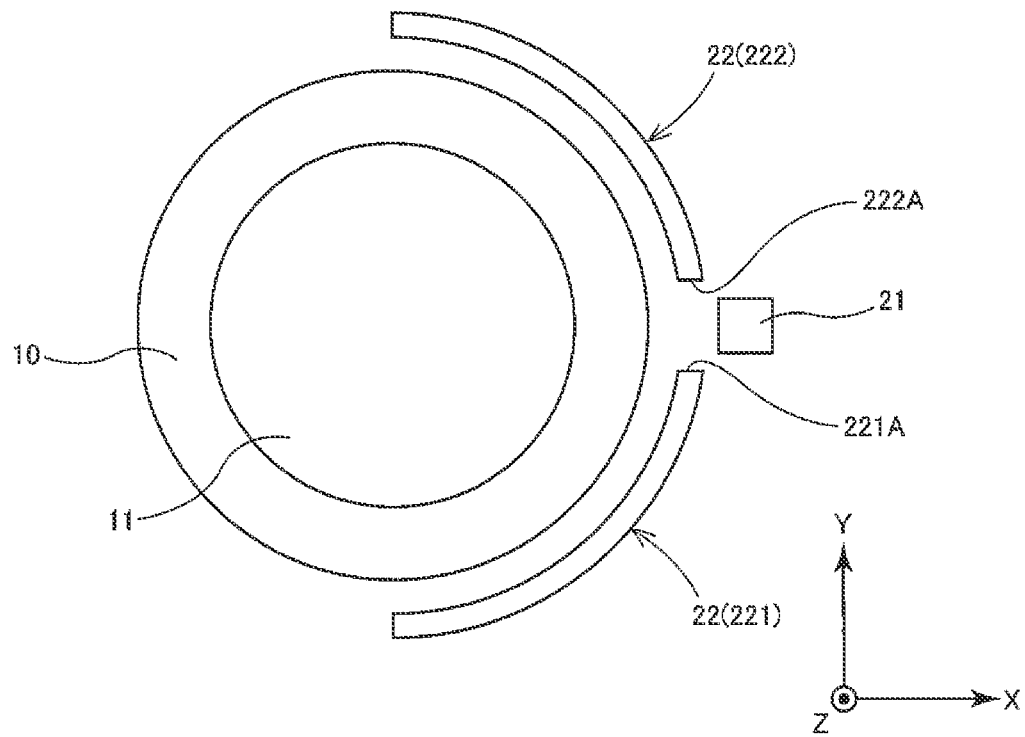
FIG. 7C is a plan view showing another aspect of the schematic configuration of the rotation angle detection device according to one example embodiment of the present disclosure.
Figure 7D:
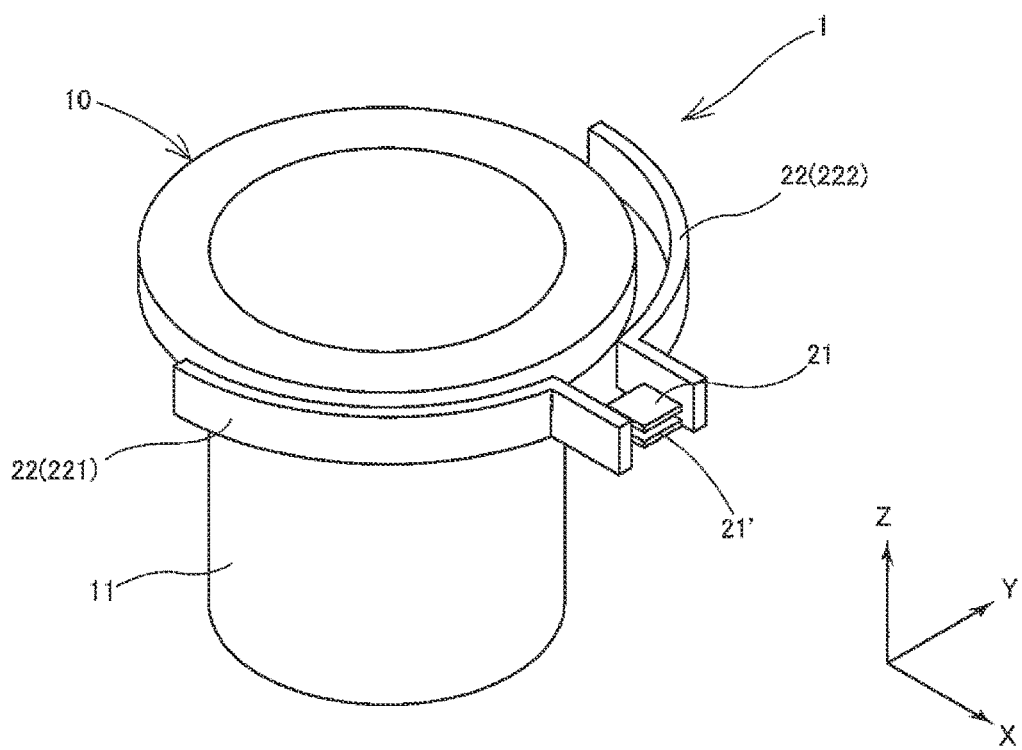
FIG. 7D is a plan view showing another aspect of the schematic configuration of the rotation angle detection device according to one example embodiment of the present disclosure.
Figure 7E:
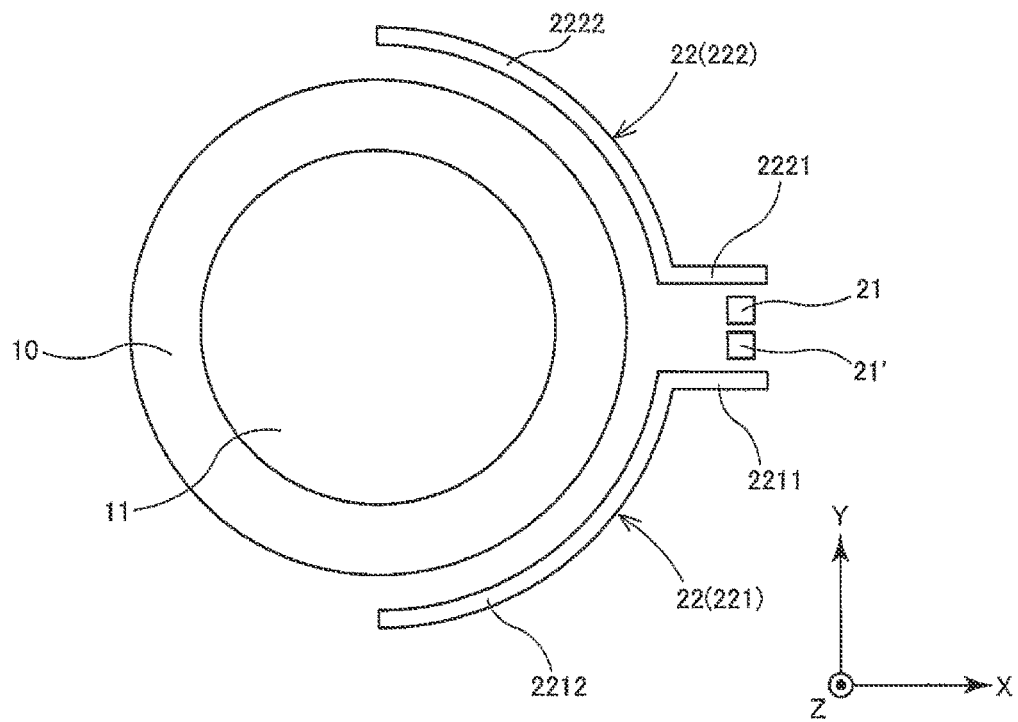
FIG. 7E is a plan view showing another aspect of the schematic configuration of the rotation angle detection device according to one example embodiment of the present disclosure.
Figure 7F:
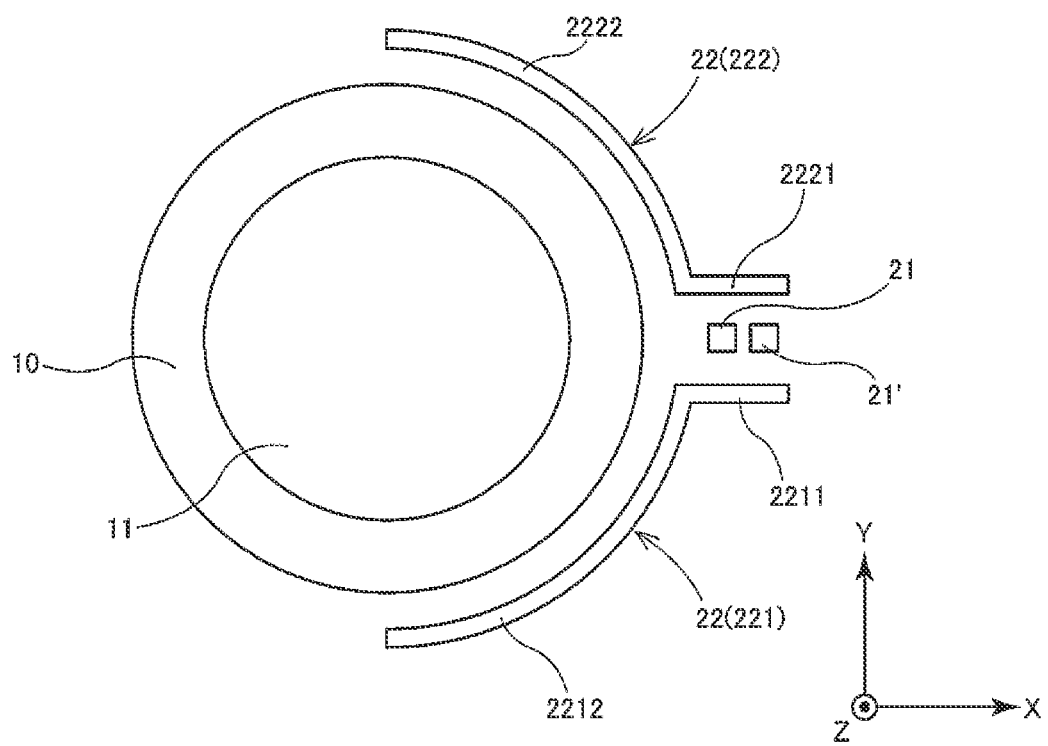
FIG. 7F is a plan view showing another aspect of the schematic configuration of the rotation angle detection device according to one example embodiment of the present disclosure.

With Sample 7, except for changing the magnetic field transmission unit 22 to the aspect shown in FIG. 7C, the strength (mT) of the magnetic field impressed on the magnetic field detection unit 21 when the magnet 10 is rotated (the composite magnetic field of the first magnetic field component Hr and the second magnetic field component Hθ) and the angular error (deg) included in the detection angle θs in the rotation angle detection unit 1 were found through simulation the same as in Sample 1. The results are shown in FIG. 10 and FIG. 11.

Sample 8

With Sample 8, except for changing the magnetic field transmission unit 22 to an aspect not provided with the magnetic field transmission unit 22, the strength (mT) of the magnetic field impressed on the magnetic field detection unit 21 when the magnet 10 is rotated (the composite magnetic field of the first magnetic field component Hr and the second magnetic field component Hθ) and the angular error (deg) included in the detection angle θs in the rotation angle detection unit 1 were found through simulation the same as in Sample 1. The results are shown in FIG. 10 and FIG. 11.

As shown in FIG. 10, it was confirmed that by providing the magnetic field transmission unit 22 covering part of the side surface 10C of the magnet 10, it becomes possible to reduce variations in the strength of the magnetic field impressed on the magnetic field detection unit 21 and to raise the minimum value of the magnetic field strength. In addition, from the results of Samples 1 to 4, it was confirmed that by having the magnetic field transmission unit 22 (the first magnetic field transmission unit 221 and the second magnetic field transmission unit 222) include the first portions 2211 and 2221 bent in the direction (+X direction) away from the side surface 10C of the magnet 10 in the XY plane via the bent portions 2213 and 2223, and the second portions 2212 and 2222 facing the side surface 10C of the magnet 10, and providing the magnetic field detection unit 21 between the first portions 2211 and 2221, it is possible to further reduce variation in the strength of the magnetic field impressed on the magnetic field detection unit 21. As shown in FIG. 11, it was confirmed that by providing the magnetic field transmission unit 22 covering part of the side surface 10C of the magnet 10, the angular error contained in the detection angle θs can be reduced.

With these example embodiments, it is possible to provide a rotation angle detection device capable of improving angular accuracy and to provide an electric control device, a traction motor unit, or a brake booster, for example, equipped with such a rotation angle detection device.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

The invention claimed is:

1. A rotation angle detection device comprising:
a magnetic field generation unit rotatable integrally with a rotating body that rotates about a predetermined rotation axis;
a magnetic field detection unit that detects a magnetic field generated by the magnetic field generation unit; and a magnetic field transmission unit that covers a portion of the magnetic field generation unit and is arranged in a single layer in a direction perpendicular to the rotation axis, wherein there is a predetermined gap between the magnetic field generation unit and the magnetic field transmission unit, the magnetic field generation unit has a first surface, the outer periphery of which has a substantially circular shape, a second surface positioned opposite to the first surface, and a side surface connecting the outer periphery of the first surface and the outer periphery of the second surface, the magnetic field transmission unit includes at least a first magnetic field transmission unit that covers a portion of the side surface at a first side of the magnetic field detection unit, the first magnetic field transmission unit has a first portion which is a portion bent in a direction away from the side surface of the magnetic field generation unit and a second portion which is a portion facing the side surface of the magnetic field generation unit, the first portion of the first magnetic field transmission unit includes a first end which is one end of the first magnetic transmission unit, the second portion of the first magnetic field transmission unit includes a second end which is another end of the first magnetic field transmission unit, the magnetic field detection unit is provided near the first end of the first magnetic field transmission unit, the magnetic field generated by the magnetic field generation unit includes a first magnetic field component along a first direction and a second magnetic field component along a second direction orthogonal to the first direction, the magnetic field detection unit detects the first magnetic field component and the second magnetic field component, when viewed along the rotation axis, a first angle formed by a first line segment connecting the rotation axis and the second end of the first magnetic field transmission unit and a third line segment connecting the rotation axis and the magnetic field detection unit is not greater than 90°, and when viewed along the rotation axis, an angular range of the first angle includes the second portion of the first magnetic field transmission unit.

2. The rotation angle detection device according to claim 1, wherein:

the magnetic field transmission unit includes a second magnetic field transmission unit that covers a portion of the side surface at a second side of the magnetic field detection unit;

the second magnetic field transmission unit has a first portion which is a portion bent in a direction away from the side surface of the magnetic field generation unit and a second portion which is a portion facing the side surface of the magnetic field generation unit;

the first portion of the second magnetic field transmission unit includes a first end which is one end of the second magnetic field transmission unit;

the second portion of the second magnetic field transmission unit includes a second end which is another end of the second magnetic field transmission unit; and the magnetic field transmission unit is provided such that the magnetic field detection unit is located between the first end of the first magnetic field transmission unit and the first end of the second magnetic field transmission unit.

3. The rotation angle detection device according to claim 2, wherein a third angle formed by the first line segment and a second line segment connecting the rotation axis and the second end of the second magnetic field transmission unit is not greater than 180°.

4. The rotation angle detection device according to claim 3, wherein the third angle is at least 60° and not greater than 180 °.

5. The rotation angle detection device according to claim 3, wherein:

when the third angle is divided into the first angle and a second angle formed by the second line segment and the third line segment, the first angle and the second angle are equivalent.

6. The rotation angle detection device according to claim 3, wherein:

when the third angle is divided into the first angle and a second angle formed by the second line segment and the third line segment, the first angle and the second angle are different.

7. The rotation angle detection device according to claim 2, wherein the second portion of the first magnetic field transmission unit and the second portion of the second magnetic field transmission unit have equal gaps from the side surface of the magnetic field generation unit in the circumferential direction of the magnetic field generation unit.

8. The rotation angle detection device according to claim 2, wherein the second portion of the first magnetic field transmission unit and the second portion of the second magnetic field transmission unit have unequal gaps from the side surface of the magnetic field generation unit in the circumferential direction of the magnetic field generation unit.

9. The rotation angle detection device according to claim 1, wherein:

the magnetic field detection unit includes a first magnetic field detection unit and a second magnetic field detection unit; and the first magnetic field detection unit and the second magnetic field detection unit are arranged at linearly symmetrical positions with a center of the magnetic field transmission unit in a direction of width as the axis of symmetry.

10. The rotation angle detection device according to claim 9, wherein the first magnetic field detection unit and the second magnetic field detection unit are arranged at positions separated by equal distances from the side surface of the magnetic field generation unit.

11. The rotation angle detection device according to claim 1, wherein the magnetic field generation unit is magnetized in the first direction.

12. The rotation angle detection device according to claim 1, comprising a first molded unit that holds at least the magnetic field detection unit.

13. The rotation angle detection device according to claim 1, comprising a second molded unit that holds the magnetic field transmission unit.

14. The rotation angle detection device according to claim 1, comprising a molded unit in which a first molded unit that holds at least the magnetic field detection unit and a second molded unit that holds the magnetic field transmission unit are integrally formed.

15. An electric control device comprising the rotation angle detection device according to claim 1.

16. A traction motor unit, comprising at least the rotation angle detection device according to claim 1 and a motor;
wherein the rotation angle detection device detects the rotation angle of the motor.

17. A brake booster, comprising at least the rotation angle detection device according to claim 1, a motor, and a master cylinder;
wherein the rotation angle detection device detects the rotation angle of the motor.

18. The rotation angle detection device according to claim 1, wherein a length of the first magnetic field transmission unit in the rotation axis direction is longer than a length of the side surface of the magnetic field generation unit in the rotation axis direction.

19. A rotation angle detection device that detects a rotation angle of a rotating body by detecting a magnetic field generated from a magnetic field generation unit rotatable integrally with the rotating body that rotates about a predetermined rotation axis and including a first surface, the outer periphery of which has a substantially circular shape, a second surface, the outer periphery of which has a substantially circular shape and being positioned opposite to the first surface, and a side surface connecting the outer periphery of the first surface and the outer periphery of the second surface, wherein the rotation angle detection device comprises:
a magnetic field detection unit that detects a magnetic field generated from the magnetic field generation unit;
a magnetic field transmission unit capable of covering a portion of the magnetic field generation unit to form a predetermined gap to the magnetic field generation unit and capable of being arranged in a single layer in a direction perpendicular to the rotation axis;
wherein
the magnetic field transmission unit includes at least a first magnetic field transmission unit capable of covering one portion of the side surface at a first side of the magnetic field detection unit,
the first magnetic field transmission unit has a first portion which is a portion bent in a direction away from the side surface of the magnetic field generation unit and a second portion which is a portion facing the side surface of the magnetic field generation unit;
the first portion of the first magnetic field transmission unit includes a first end which is one end of the first magnetic field transmission unit;
the second portion of the first magnetic field transmission unit includes a second end which is another end of the first magnetic field transmission unit;
the magnetic field detection unit is provided near the first end of the first magnetic field transmission unit;
the magnetic field generated from the magnetic field generation unit includes a first magnetic field component along a first direction and a second magnetic field component along a second direction orthogonal to the first direction;
the magnetic field detection unit detects the first magnetic field component and the second magnetic field component,
a first angle formed by a first line segment connecting the rotation axis and the second end of the first magnetic field transmission unit and a third line segment connecting the rotation axis and the magnetic field detection unit is not greater than 90°, and
when viewed along the rotation axis, an angular range of the first angle includes the second portion of the first magnetic field transmission unit.

20. The rotation angle detection device according to claim 19, wherein:
the magnetic field transmission unit includes a second magnetic field transmission unit that covers one portion of the side surface at a second side of the magnetic field detection unit;
the second magnetic field transmission unit has a first portion which is a portion bent in a direction away from the side surface of the magnetic field generation unit and a second portion which is a portion facing the side surface of the magnetic field generation unit;
the first portion of the second magnetic field transmission unit includes a first end which is one end of the second magnetic field transmission unit,
the second portion of the second magnetic field transmission unit includes a second end which is another end of the second magnetic field transmission unit, and
the magnetic field transmission unit is provided such that the magnetic field detection unit is located, between the first end of the first magnetic field transmission unit and the first end of the second magnetic field transmission unit.

* * * * *